United States Patent [19]

Hayashi et al.

[11] 4,368,427

[45] Jan. 11, 1983

[54] DIGITAL INDICATION TYPE SPEEDOMETER

[75] Inventors: Kunihisa Hayashi; Masakazu Moriyama, both of Toyota, Japan

[73] Assignee: Toyota Jidosha Kogyo Kabushiki Kaisha, Toyota, Japan

[21] Appl. No.: 218,834

[22] Filed: Dec. 22, 1980

[30] Foreign Application Priority Data

Dec. 28, 1979 [JP] Japan ............................. 54-170606

[51] Int. Cl.$^3$ ............................................. G01P 3/48
[52] U.S. Cl. ............................... 324/161; 235/92 FQ
[58] Field of Search .................... 324/161, 166, 78 D, 324/78 Z, 79 D; 340/670, 671; 361/236, 240; 235/92 FQ, 92 TF

[56] References Cited

U.S. PATENT DOCUMENTS 4,151,466 4/1979 Boyer et al. .................... 235/92 FQ
4,204,157 5/1980 Javeri ................................. 324/166
4,243,938 1/1981 Bliven et al. ....................... 324/161

Primary Examiner—David C. Nelms
Attorney, Agent, or Firm—Cushman, Darby & Cushman

[57] ABSTRACT

A digital indication type speedometer comprising a speed counter for counting speed pulses emitted in proportion to a vehicle speed for a given gate time, an indication register for latching a value to be indicated commensurate to an output from said speed counter and an indicator for indicating the value latched in said indication register is of such an arrangement that a hysteresis processing circuit is provided, which rewrites the value latched in said indication register in accordance with an output of said speed counter only when a difference between the output of said speed counter and the value latched in said indication register is not within tolerance limit upon comparison therebetween, so that response of the indication is excellent during acceleration or deceleration, and no flickering is observed during running at a constant speed.

10 Claims, 7 Drawing Figures

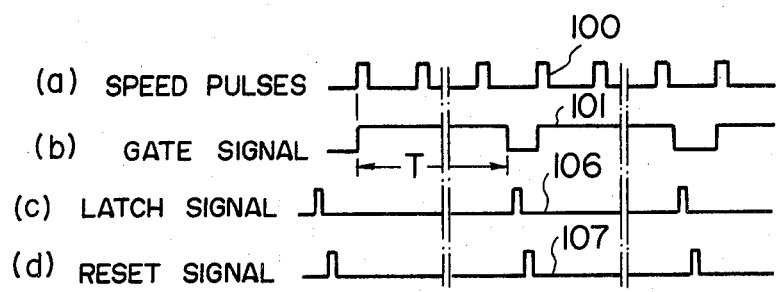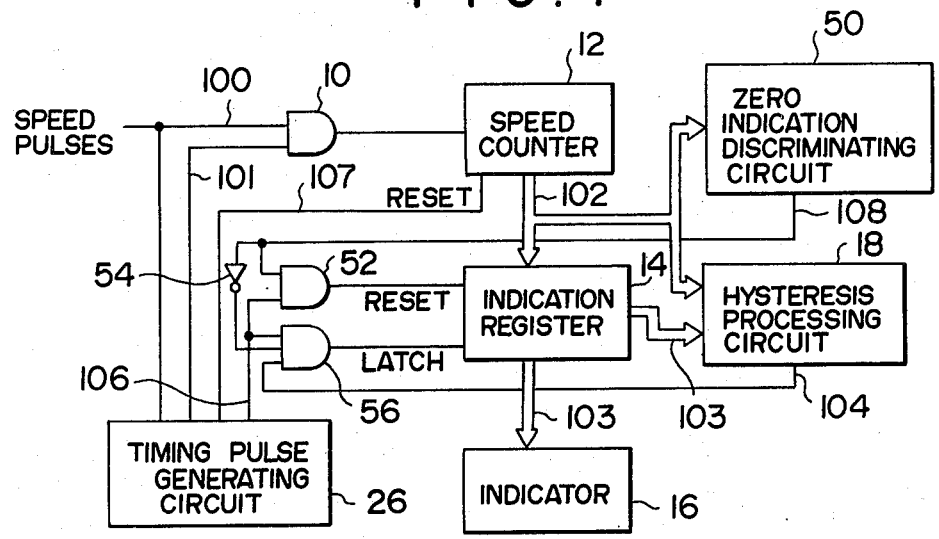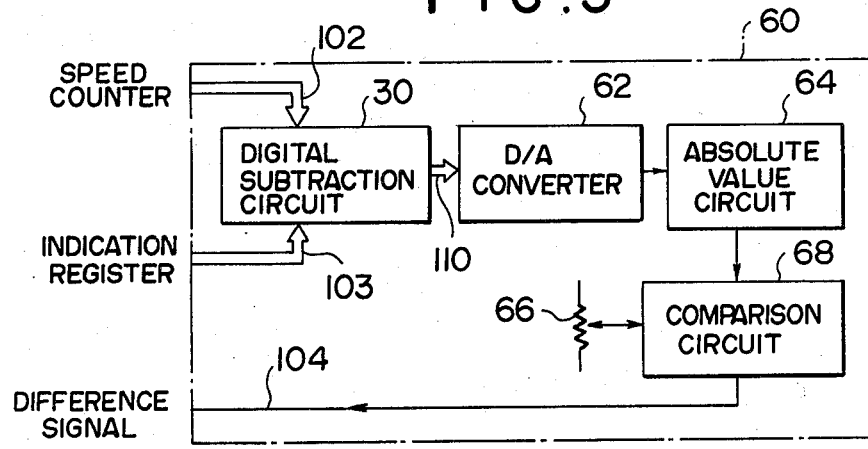

DIGITAL INDICATION TYPE SPEEDOMETER

BACKGROUND OF THE INVENTION

1. Field of the Invention

The present invention relates to digital indication type speedometers, and particularly to improvements in a digital indication type speedometer comprising a speed counter for counting speed pulses emitted in proportion to a vehicle speed for a given gate time, an indication register for latching a value to be indicated commensurate to an output from said speed counter and an indicator for indicating the value latched in said indication register.

2. Description of the Prior Art

In general, a digital indication type speedometer for digitally indicating a running speed of a vehicle or the like comprises a speed counter for counting speed pulses emitted in proportion to a vehicle speed through the rotation of a propeller shaft, wheel or the like for a given gate time, an indication register for latching the preceding value counted by the speed counter while the speed counter is counting, and an indicator for indicating the value latched in the indication register. This digital indication type speedometer has such a characteristic feature that the vehicle speed is constantly digitally indicated by the indicator. However, with this speedometer, heretofore, an output of the speed counter has been directly latched in the indication registor as a value to be indicated, which is repeatedly indicated by the indicator, thereby a rewriting cycle of an indication is limited to substantially each given gate time, and the change in indication is slow during acceleration or deceleration, thus presenting a feeling of incompatibility between the degree of acceleration or deceleration and the change in indication. Whereas, during running at a constant speed, the change in indication is frequently made in accordance with slight changes in the vehicle speed as if it flickers, thereby deteriorating easiness in reading. More specifically, during running at a value between 59 km/h and 60 km/h for example, both of 59 km/h and 60 km/h are alternately indicated. This reaches its worst condition when an intermediate speed between 59 km/h and 60 km/h is set in a cruising speed control device of the vehicle. The shorter the gate time is, the more intense the flickering changes in indication become. Therefore, as a remedy for it, it has been taken into account to extend the gate time. However, if the response during acceleration or deceleration is taken into consideration, there is a limit in extending the gate time. Consequently, heretofore, there has been selected an intermediate value of a gate time in consideration of both factors as described above. However, the value thus selected could satisfy neither the condition during acceleration or deceleration, nor the condition during running at a constant speed.

In order to obviate the disadvantages as described above, it has been considered to change the gate time and the rewriting cycle of indication in accordance with the running conditions of the vehicle. However, the abovedescribed arrangement not only requires an acceleration sensor for sensing the running condition of the vehicle but also makes the after-treatment of signals be complicated, so that the abovedescribed arrangement is not practicable.

SUMMARY OF THE INVENTION

The present invention has been developed to obviate the abovedescribed disadvantages of the prior art, and has as its object the provision of a digital indication type speedometer capable of making satisfactory indications without presenting any feeling of incompatibility, both in the condition during acceleration or deceleration and the condition during running at a constant speed, and excellent in easiness in reading.

To accomplish the abovedescribed object, according to the present invention, a digital indication type speedometer comprising a speed counter for counting speed pulses emitted in proportion to a vehicle speed for a given gate time, an indication register for latching a value to be indicated commensurate to an output from said speed counter and an indicator for indicating the value latched in said indication register is of such an arrangement that a hysteresis processing circuit is provided, which rewrites the value latched in said indication register in accordance with an output of said speed counter only when a difference between the output of said speed counter and the value latched in said indication register is not within tolerance limit upon comparison therebetween.

According to the present invention, even if the gate time is shortened, there is no possibilities of the indications flickering, satisfactory indications are obtainable both in the condition during acceleration or delecelation, and in the condition during running at a constant speed, and the feeling of incompatibility, which would have been felt with the conventional digital indication type speedometer, may be eliminated.

BRIEF DESCRIPTION OF THE DRAWINGS

The above mentioned features and objects of the present invention will become more apparent by reference to the following description taken in conjunction with the accompanying drawings, wherein like referenced numerals denote like elements, and in which:

FIG. 3 is a diagram showing the waveshapes of the actions of various parts in the first embodiment;

FIG. 4 is a block diagram showing the general arrangement of a second embodiment of the digital indication type speedometer according to the present invention;

FIG. 5 is a block diagram showing a first modification of the hysteresis processing circuit for use in the present invention;

DETAILED DESCRIPTION OF THE INVENTION

Figure 1:
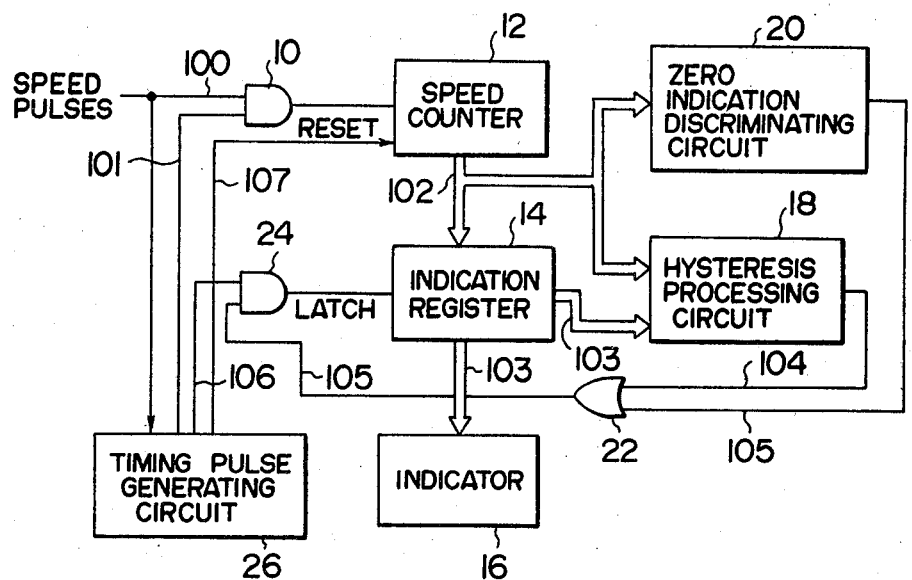
FIG. 1 is a block diagram showing the general arrangement of a first embodiment of the digital indication type speedometer according to the present invention.

Detailed description will hereunder be given of the embodiments of the present invention with reference to the drawings. As shown in FIG. 1, in a first embodiment of the present invention, a digital indication type speedometer comprises: a speed counter 12 for counting speed pulses 100 emitted in proportion to a vehicle speed through the rotation of the wheel for a given gate time during which an AND gate 10 is opened in response to a gate signal 101; an indication register 14 for latching a value to be indicated in response to an output signal 102 from the speed counter 12; and an indicator 16 comprising any one of an indicating fluorescent tube, a plasma display, a liquid crystal, a luminescent diode and the like for indicating a value 103 latched in the indication register 14; further comprises: a hysteresis processing circuit 18 for emitting a difference signal 104 (a signal indicating the presence of a difference) for rewriting a value latched in the indication register 14 in response to an output signal 102 of the speed counter 12 only when a difference between the output signal 102 from the speed counter 12 and the value 103 latched in the indication register 14 is not within tolerance limit such as ±1 km/h or ±1 mile/h upon comparison therebetween; and a zero indication discriminating circuit 20 for emitting a zero indication signal 105 to rewrite the value latched in the indication register 14 and indicate zero in response to the output signal 102 from the speed counter 12 when the output signal 102 from the speed counter 12 is zero for the purpose of preventing an offset in indication occurring due to the provision of the hysteresis processing circuit 18 between an output from the speed counter 12 and an indication of the indicator 16 when the actual vehicle speed is 0 km/h or 0 mile/h. In the drawing: designated at 22 is an OR gate for emitting a logical sum of an output from the hysteresis processing circuit 18 and an output from the zero indication discriminating circuit 20; 24 an AND gate for feeding an output signal 105 of the OR gate 22 to the indication register 14 in response to a latch signal 106 emitted from a timing pulse generating circuit 26 at a timing suitable for rewriting the indication register 14, and 26 the timing pulse generating circuit for feeding a given gate signal 101 to determine the counting time of the speed counter 12, the gate-on timing of which is synchronized with the rise of the speed pulse 100, to the AND gate 10, further feeding the latch signal 106 to the AND gate 24 at a timing suitable for feeding a counted value of the speed counter 12 to the indication register 14 upon counting, and further feeding a reset signal 107 for restoring the counted value of the speed counter 12 to zero to the speed counter 12 upon feeding the abovedescribed counted value.

Figure 2:
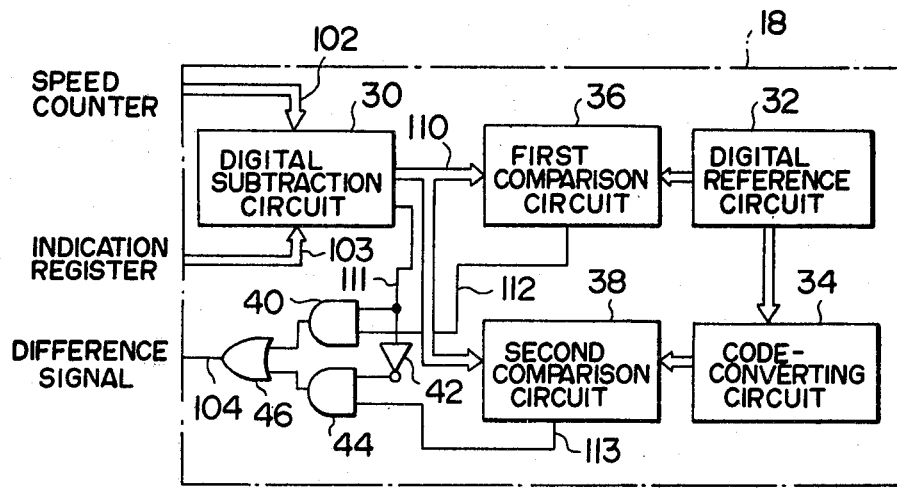
FIG. 2 is a block diagram showing an example of arrangement of the hysteresis processing circuit in the first embodiment.

The aforesaid hysteresis processing circuit 18, as shown in FIG. 2 for example, comprises: a digital subtraction circuit 30 for calculating a difference between the output signal 102 of the speed counter 12 and the value 103 latched in the indication register 14; a digital reference circuit 32 for digitally presetting a hysteresis reference value, e.g., 1 km/h or 1 mile/h; a code-converting circuit 34 for code-converting the digital reference value of the digital reference circuit 32 into a value of complement thereof; a first comparison circuit 36 for emitting an output signal 112 based on an output 110 of the result of subtraction of the digital subtraction circuit 30 when the output from the speed counter 12, exceeding the reference value of the digital reference circuit 32, becomes larger than the value latched in the indication register 14; a second comparison circuit 38 for emitting an output signal 113 also based on the output 110 of the result of subtraction of the digital subtraction circuit 30 when the output from the speed counter 12, exceeding the reference value of the digital reference circuit 32, which has been code-converted into a value of complement thereof by the code-converting circuit 34, becomes smaller than the value latched in the indication register 14; a first AND gate 40 openable by a positive-negative sign signal 111 indicating "1" to a positive sign and "0" to a negative sign of the result of subtraction of the digital subtraction circuit 30, when the result of subtraction is positive, so as to pass an output signal 112 from the first comparison circuit 36; a second AND gate 44 openable by the positive-negative sign signal 111 inverted by an inverter 42, when the result of subtraction is negative, so as to pass an output signal 113 from the second comparison circuit 38; and an OR gate 46 for emitting a logical sum of the first AND gate 40 and the second AND gate 44 as the difference signal 104.

Consequently, this hysteresis processing circuit 18 is adapted to seek a difference between the output signal 102 of the speed counter 12 and the value 103 latched in the indication register 14, and, when the difference is not within the tolerance limit, indicate the difference signal 104 as "1." More specifically, the value 103 latched in the indication register 14 is subtracted from the output signal 102 from the speed counter 12 in the digital subtraction circuit 30, the result of subtraction is compared with the hysteresis reference value in the digital reference circuit 32, i.e., +1 km/h in the first comparison circuit 36, and, when the result of subtraction is larger than the reference value, the output signal 112 from the comparison circuit 36 is indicated as "1." Furthermore, in the second comparison circuit 38, the result of subtraction of the digital subtraction circuit 30 is compared with a complement value of the reference value of the digital reference circuit 32 sought in the code-converting circuit 34, and, when the result of subtraction is smaller in value than the output from the code-converting circuit 34, the output signal 113 is indicated as "1." The first and second AND gates 40 and 44 are for use in selecting either one of comparison circuits in dependence upon the sign of the output from the digital subtraction circuit 30, which is either positive or negative. When the result of subtraction of the digital subtraction circuit 30 is positive and the positive-negative sign signal 111 is "1," the first AND gate 40 is opened, and, when the result of subtraction of the digital subtraction circuit 30 is negative and the positive-negative sign signal 111 is "0," the second AND gate 44 is opened. The OR gate 46 is adapted to indicate the difference signal 104 as "1," when either the first AND gate 40 or the second AND gate 44 emits an output.

Description will hereunder be given of operation with reference to FIG. 3. The speed pulses 100 emitted in proportion to the vehicle speed through the rotation of the wheel as shown in FIG. 3(*a*) are fed to the speed counter 12 through the AND gate 10 and counted for a given time T during which the gate signal 101 from the timing pulse generating circuit 26 as shown in FIG. 3(*b*) is indicated as "1" to open the AND gate 10. This gate signal 101 is synchoronized with the rise of the speed pulse 100 to be indicated as "1," continues to be indicated as "1" for the given time T, and thereafter, is indicated as "0." With this arrangement, the dispersion in values counted by the speed counter is prevented which is caused by the offset of the gate signals 101 relative to the speed pulses 100. Upon the change of this gate signal 101 to "0," the latch signals 106 as shown in FIG. 3(*c*) is fed to the AND gate 24 from the timing pulse generating circuit 26. In parallel with this, the difference between the output signal 102 of the speed counter 12 and the value 103 latched in the indication register 14 is sought in the hysteresis processing circuit 18, and, when the difference thus sought exceeds the reference value preset by the digital reference circuit 32 in either positive or negative direction, the difference signal 104 is indicated as "1." This difference signal 104 is fed through the OR circuit 22 to the AND gate 24, where it is turned to be the gate signal for the aforesaid latch signal 106. With the arrangement as described above, in the case the difference signal 104 is indicated as "1," if "1" is fed to the latch signal 106 from the timing pulse generating circuit 26, then the output from the AND gate 24 is indicated as "1," and the value latched in the indication register 14 is rewritten in accordance with the output signal 102 (counted value) from the speed counter 12. While, in the case the difference between the output signal 102 of the speed counter 12 and the value 103 latched in the indication register 14 does not exceed the reference value, the value latched in the indication register 14 is not rewritten.

The timing pulse generating circuit 26, upon feeding "1" to the latch signal 106, feeds a reset signal 107 as shown in FIG. 3(d) to the speed counter 12 to reset the value counted by the speed counter 12 to 0. After "1" is fed to this reset signal 107, if "1" is fed by the speed pulse 100, then the gate signal 101 is again emitted in synchronism with the rise of the speed pulse 100 from the timing pulse generating circuit 26, whereby the succeeding cycle of counting is started.

In this embodiment, when the difference between the output (counted value) from the speed counter 12 and the value latched in the indication register 14 does not exceed the predetermined value preset by the hysteresis processing circuit 18, e.g., ±1 km/h or ±1 mile/h, the value latched in the indication register 14 is not changed, whereby the indicated value of the indicator 16 is held at a constant value, so that the indication of the indicator 16 can be prevented from flickering during running at a constant speed. On the other hand, under the condition where the output from the speed counter 12 is changed to a considerable extent as in acceleration or deceleration, the value latched in the indication register 14 is rewritten every moment, so that problems in response during acceleration or deceleration can be eliminated.

The provision of the hysteresis processing circuit 18 as described above can prevent the indication of the indicator 16 from flickering. While, in the case, despite the difference between the output from the speed counter 12 and the value latched in the indication register 14 is within the tolerance limit, it is desired to set the value indicated by the indicator 16 to the predetermined value, e.g., when the vehicle is stopped, the value latched in the indication register 14 stays at 1 and does not become zero due to the action of the aforesaid hysteresis processing circuit 18, thereby giving a feeling of incompatibility to the driver. Consequently, in this embodiment, the provision of the zero indication discriminating circuit 20 solves this problem. Namely, the zero indication discriminating circuit 20 constantly monitors the output from the speed counter 12, and, when the output signal 102 from the speed counter 12 becomes zero, feeds the zero signal 105 to the OR gate 22 irrespective of the condition of the output from the hysteresis processing circuit 18, the value latched in the indication register 14 is rewritten by the AND gate 24 in accordance with the output signal 102 (0) of the speed counter 12 at a timing corresponding to the latch signal 106 from the timing pulse generating circuit 26, the value latched in the indication register 14 becomes zero, and the indicated value of the indicator 16 become 0 km/h or 0 mile/h.

By presetting the gate time of the speed counter at 0.2~0.5 sec, the hysteresis reference value ±1 km/h and each of the speed pulses at 0.5 km/h/pulse, such satisfactory results were attained that the response is excellent during acceleration or deceleration, no feeling of incompatibility between the feeling of acceleration or deceleration and the change in the indicated value is felt, and no flickering is observed during running at a constant speed.

On the other hand, there are cases where, in order to indicate the vehicle speed 0 at the time of stop of the vehicle to a vehicle driver in advance, it is desirable to forcibly indicate the indicated value at zero when the actual vehicle speed is not zero but reaches a reference value, e.g., 5 km/h or less. FIG. 4 shows a second embodiment of the present invention in which the abovedescribed requirement is fulfilled. This embodiment is of such an arrangement that the zero indication discriminating circuit 50 emits "1" as the zero indication signal when the output signal 102 of the speed counter 12 reaches a predetermined value, e.g., a value corresponding to 5 km/h or less, and this embodiment further comprises an AND gate 52 for feeding a logical product of the zero indication signal 108 and the latch signal 106 from the timing pulse generating circuit 26 to the indication register 14 as a reset signal and a three input AND gate 56 for feeding a logical product of the zero indication signal 108 inverted by the invertor 54, the latch signal 106 and the difference signal 104 from the hysteresis processing circuit 18 to the indication register 14 as a latch signal. This second embodiment is identical in other respects with the aforesaid first embodiment, so that detailed description thereof will be omitted.

In this embodiment, when the output signal 102 of the speed counter 12 reaches the predetermined value or less, the zero indication signal 108 from the zero indication discriminating circuit 50 is indicated as "1." Consequently, irrespective of the condition of the output from the hysteresis processing circuit 18, when the latch signal 106 from the timing pulse generating circuit 26 is indicated as "1," the value latched in the indication register 14 is forcibly reset to zero, and consequently, the indicated value of the indicator 16 is set at 0 km/h or 0 mile/h in advance of the actual vehicle speed.

In addition, in the respective embodiments as described above, the hysteresis processing circuits each comprise digital circuits, and the reference values are ones identical with each other in either positive or negative direction. However, the hysteresis processing circuits are not limited to ones shown in the abovedescribed embodiments. FIG. 5 shows a first modification of the hysteresis processing circuit for use in the present invention. This hysteresis processing circuit 60 comprises: a degital subtraction circuit 30 similar to the one shown in the proceding embodiment; a digital/analog converter (hereinafter referred to as the "D/A converter") 62 for converting an output 110 (a digital signal) as the result of subtraction in the digital subtraction circuit 30 into an analog signal; an absolute value circuit 64 for obtaining an absolute value of an output from the D/A converter 62; and a comparison circuit 68 for comparing an output from the absolute value circuit 64 with an analog-preset hysteresis reference value in an analog reference circuit 66 and emitting a difference signal 104.

In this hysteresis processing circuit 60, an output 110 (a digital signal) as the result of subtraction in the digital subtraction circuit 30 is converted into an analog signal having a voltage which is positive or negative by the D/A converter 62. More specifically, in the case the output signal 102 from the speed counter 12 is larger in value than the value 103 latched in the indication register 14, a positive voltage is supplied, and, in the case the output signal 102 from the speed counter 12 is smaller in value than the value 103 latched in the indication register 14, a negative voltage is supplied. The positive or negative voltage as an output from this D/A converter 62 is obtained by the absolute value circuit 64 as an absolute value, which is compared, in the comparison circuit 68, with the reference value preset in the analog reference circuit 66, and, when the output from the absolute value circuit 64 is larger than the reference value, the difference signal 104 is indicated as "1."

Figure 6:
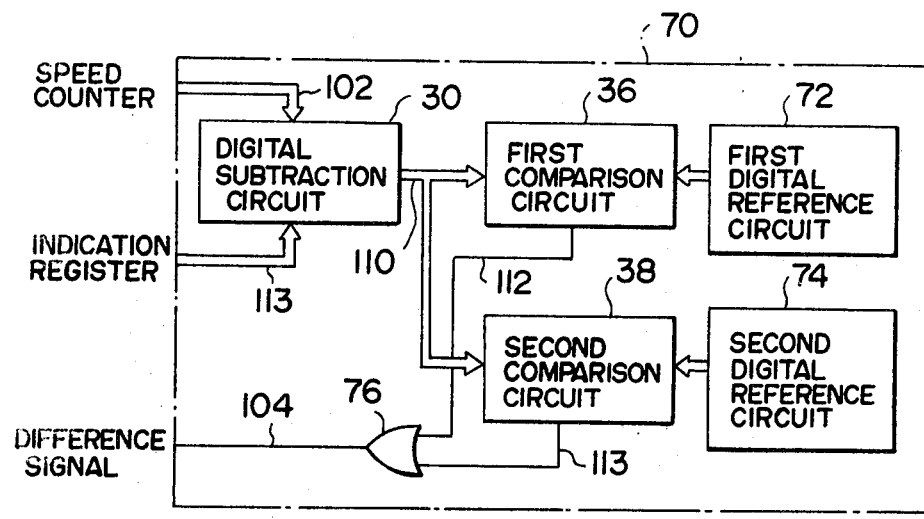
FIG. 6 is a block diagram showing a second modification thereof.

FIG. 6 shows a second modification of the hysteresis processing circuit for use in the present invention. This hysteresis processing circuit 70 comprises: a digital subtraction circuit 30 similar to the one shown in the preceding embodiment; a first digital reference circuit 72 for digitally presetting a positive hysteresis reference value; a first comparison circuit 36 similar to the one shown in the preceding embodiment for comparing the positive reference value preset by the first digital reference circuit 72 with the output 110 as the result of subtraction in the digital subtraction circuit 30 and emitting an output signal 112 when the result of subtraction is larger in value than the positive reference value; a second digital reference circuit 74 for digitally presetting a negative hysteresis reference value; a second comparison circuit 38 similar to the one shown in the preceding embodiment for emitting an output signal 113 when the output 110 as the result of subtraction in the digital subtraction circuit 30 is smaller in value than the negative reference value; and an OR gate 76 for emitting a logical sum of outputs from the first comparison circuit 36 and the second comparison circuit 38 as a difference signal 104.

In this hysteresis processing circuit 70, the positive reference value is preset at a value different from the negative reference value, so that the actual control of the law in which the control on the positive side is loose but severe on the negative side can be readily dealt with.

Figure 7:
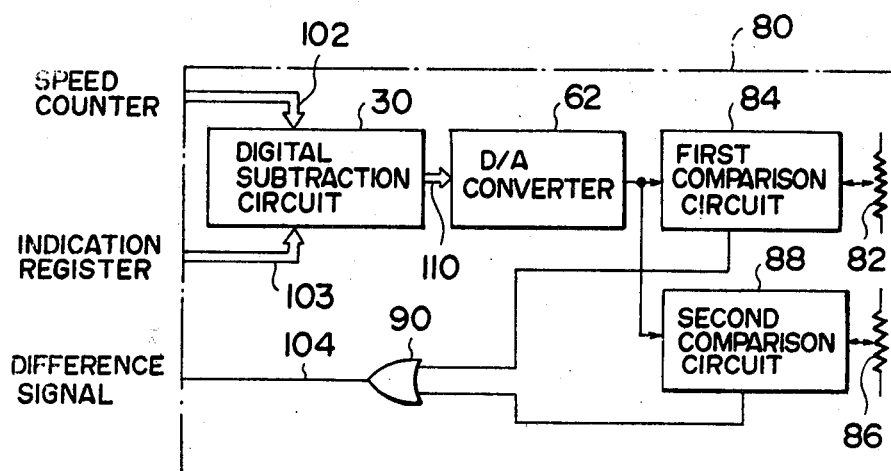
FIG. 7 is a block diagram showing a third modification thereof.

FIG. 7 shows a third modification of the hysteresis processing circuit for use in the present invention. This hysteresis processing circuit 80 comprises: a digital subtraction circuit 30 similar to the one shown in the preceding embodiment; a D/A converter 62 similar to the one shown in the first modification; a first analog reference circuit 82 for analogously presetting a positive hysteresis reference value; a first comparison circuit 84 for comparing the positive reference value of the first analog reference circuit 82 with an output from the D/A converter 62 and emitting an output when the output from the D/A converter 62 is larger in value than the positive reference value; a second analog reference circuit 86 for analogously presetting a negative hysteresis reference value; a second comparison circuit 88 for comparing the negative reference value of the second analog reference circuit 86 with an output from the D/A converter 62 and emitting an output when the output from the D/A converter 62 is smaller in value than the negative reference value; and an OR gate 90 for emitting a logical sum of outputs from the first comparison circuit 84 and the second comparison circuit 88 as a difference signal 104.

In this hysteresis processing circuit 80 also, the positive reference value is preset at a value different from the negative reference value, so that the control of the law can be readily dealt with.

From the foregoing description, it should be apparent to one skilled in the art that the abovedescribed embodiment is but one of many possible specific embodiments which can represent the applications of the principles of the present invention. Numerous and varied other arrangements can be readily devised by those skilled in the art without departing from the spirit and scope of the invention.

What is claimed is:

1. A digital indication type speedometer comprising:
    a speed counter for counting speed pulses emitted in proportion to a vehicle speed for a given gate time;
    an indication register for latching a value to be indicated commensurate to an output from said speed counter;
    an indicator for indicating the value latched in said indication register; and
    a hysteresis processing circuit for rewriting the value latched in said indication register in accordance with an output of said speed counter only when a difference between the output of said speed counter and the value latched in said indication register is not within tolerance limit upon comparison therebetween.

2. A digital indication type speedometer as set forth in claim 1, wherein said tolerance limits in said hysteresis processing circuit has identical reference values with each other in either positive or negative direction.

3. A digital indication type speedometer as set forth in claim 2, wherein said identical reference value are ±1 km/h or ±1 mile/h.

4. A digital indication type speedometer as set forth in claim 2, wherein said hysteresis processing circuit comprises:
    a digital subtraction circuit for calculating a difference between the output of said speed counter and the value latched in said indication register;
    a digital reference circuit for digitally presetting a hysteresis reference value;
    a code-converting circuit for code-converting the digital reference value of said digital reference circuit into a value of complement thereof;
    a first comparison circuit for emitting an output based on the result of subtraction of said digital subtraction circuit when the output from said speed counter, exceeding the reference value of said digital reference circuit, becomes larger than the value latched in said indication register;
    a second comparison circuit for emitting an output based on the result of subtraction of said digital subtraction circuit when the output from said speed counter, exceeding the reference value of said digital reference circuit, which has been code-converted into a value of complement thereof by said code-converting circuit, becomes smaller than the value latched in said indication register;
    a first AND gate openable by a positive sign of the result of subtraction of said digital subtraction circuit, so as to pass an output from said first comparison circuit;

a second AND gate openable by a negative sign of the result of subtraction of said digital subtraction circuit, so as to pass an output from said second comparison circuit; and an OR gate for emitting a logical sum of said first and second AND gates as a difference signal.

5. A digital indication type speedometer as set forth in claim 2, wherein said hysteresis processing circuit comprises:

a digital subtraction circuit for calculating a difference between the output of said speed counter and the value latched in said indication register;

a digital/analog converter for converting an output as the result of subtraction in said digital subtraction circuit into an analog signal;

an absolute value circuit for obtaining an absolute value of an output from said digital/analog converter;

an analog reference circuit for analogously presetting a hysteresis reference value; and a comparison circuit for comparing an output from said absolute value circuit with the reference value in said analog reference circuit and emitting a difference signal.

6. A digital indication type speedometer as set forth in claim 1, wherein said tolerance limit in said hysteresis processing circuit has different reference values with each other between positive side and negative side.

7. A digital indication type speedometer as set forth in claim 6, wherein said hysteresis processing circuit comprises:

a digital subtraction circuit for calculating a difference between the output of said speed counter and the value latched in said indication register;

a first digital reference circuit for digitally presetting a positive hysteresis reference value;

a first comparison circuit for emitting an output based on an output of the result of subtraction of said digital subtraction circuit when the output from said speed counter, exceeding the positive reference value, becomes larger than the value latched in said indication register;

a second digital reference circuit for digitally presetting a negative hysteresis reference value;

a second comparison circuit for emitting an output based on an output of the result of subtraction of said digital subtraction circuit when the output from said speed counter, exceeding the negative reference value, becomes smaller than the value latched in said indication register; and an OR gate for emitting a logical sum of outputs from said first and second comparison circuits as a difference signal.

8. A digital indication type speedometer as set forth in claim 6, wherein said hysteresis processing circuit comprises:

a digital subtraction circuit for calculating a difference between the output of said speed counter and the value latched in said indication register;

a digital/analog converter for converting an output as the result of subtraction in said digital subtraction circuit into an analog signal;

a first analog reference circuit for analogously presetting a positive hysteresis reference value;

a first comparison circuit for comparing the positive reference value with an output from said digital/analog converter and emitting an output when the output from said digital/analog converter is larger than the positive reference value;

a second analog reference circuit for analogously presetting a negative hysteresis reference value;

a second comparison circuit for comparing the negative reference value with an output from said digital/analog converter and emitting an output when the output from said digital/analog converter is smaller than the negative reference value; and an OR gate for emitting a logical sum of outputs from said first and second comparison circuit as a difference signal.

9. A digital indication type speedometer as set forth in claim 1, further comprising:

a zero indication discriminating circuit for emitting a zero indication signal to rewrite the value latched in said indication register and indicate zero in response to the output from said speed counter when the output from said speed counter is zero.

10. A digital indication type speedometer as set forth in claim 1, further comprising:

a zero indication discriminating circuit for emitting a zero indication signal to rewrite the value latched in said indication register and indicate zero in response to the output from said speed counter when the output from said speed counter reaches a predetermined value or less.

* * * * *